United States Patent
Jeong et al.

(10) Patent No.: US 8,112,087 B2
(45) Date of Patent: Feb. 7, 2012

(54) METHOD AND APPARATUS FOR SETTING UP RADIO RESOURCE CONTROL CONNECTION

(75) Inventors: Kyeong-In Jeong, Hwaseong-si (KR); Gert Jan Van Lieshout, Staines (GB); Himke Van Der Velde, Staines (GB); Sung-Ho Choi, Suwon-si (KR); O-Sok Song, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1281 days.

(21) Appl. No.: 11/787,434

(22) Filed: Apr. 16, 2007

(65) Prior Publication Data
US 2008/0039094 A1    Feb. 14, 2008

(30) Foreign Application Priority Data
Apr. 14, 2006  (KR) .................. 10-2006-0033967

(51) Int. Cl.
*H04W 36/00* (2009.01)
(52) U.S. Cl. ........ 455/436; 455/422; 455/437; 455/442; 370/328; 370/338
(58) Field of Classification Search .................. 455/436, 455/422, 437, 442; 370/331, 332, 328
See application file for complete search history.

(56) References Cited

U.S. PATENT DOCUMENTS

| | | | |
|---|---|---|---|
| 5,722,072 A * | 2/1998 | Crichton et al. .............. 455/437 |
| 6,178,326 B1 * | 1/2001 | Kalliokulju .................. 455/437 |
| 6,708,041 B1 * | 3/2004 | Butovitsch et al. ........... 455/522 |
| 6,978,138 B2 * | 12/2005 | Japenga et al. ................ 455/436 |
| 7,092,716 B2 * | 8/2006 | Nizri et al. .................... 455/448 |
| 7,203,512 B2 * | 4/2007 | Jeong et al. .................... 455/522 |
| 7,400,593 B2 * | 7/2008 | Choi et al. ..................... 370/310 |
| 7,535,846 B2 * | 5/2009 | Kim et al. ...................... 370/241 |
| 7,620,386 B2 * | 11/2009 | Wood, III ...................... 455/411 |
| 2002/0045451 A1 * | 4/2002 | Hwang et al. ................. 455/442 |
| 2003/0003928 A1 | 1/2003 | Marjelund et al. | |

(Continued)

FOREIGN PATENT DOCUMENTS

EP    1 439 668    7/2004

(Continued)

OTHER PUBLICATIONS

Universal Mobile Telecommunications System(UMTS); Radio Resource Control (RRC) protocol specification (3GPP TS 25.331 version 5.0.0 Release 5), Mar. 2002 http://pda.etsi.org/exchangefolder/ts_125331v050000p.pdf.*

(Continued)

*Primary Examiner* — Kamran Afshar
*Assistant Examiner* — Marisol Fahnert
(74) *Attorney, Agent, or Firm* — The Farrell Law Firm, P.C.

(57) ABSTRACT

A method and apparatus for establishing an RRC connection are provided, in which a UE compares the strength of a signal received from a serving cell with a threshold, upon receipt of a request for RRC connection establishment, transmits an RRC connection request message to a RAN, measures the strengths of signals from neighbor cells during a first time period and monitors a downlink channel of the serving cell to receive a response message for the RRC connection request message during a second time period, if the signal strength of the serving cell is less than the threshold, and receives the response message from the RAN on the downlink channel.

17 Claims, 10 Drawing Sheets

U.S. PATENT DOCUMENTS

| | | | |
|---|---|---|---|
| 2003/0108027 A1* | 6/2003 | Kim et al. | 370/345 |
| 2003/0218995 A1* | 11/2003 | Kim et al. | 370/318 |
| 2004/0147266 A1* | 7/2004 | Hwang et al. | 455/445 |
| 2005/0118993 A1* | 6/2005 | Roux et al. | 455/423 |
| 2005/0221824 A1* | 10/2005 | Lee et al. | 455/435.2 |
| 2005/0221827 A1* | 10/2005 | Natsume | 455/437 |
| 2006/0013176 A1* | 1/2006 | De Vos et al. | 370/338 |
| 2007/0004445 A1* | 1/2007 | Dorsey et al. | 455/525 |
| 2007/0010253 A1* | 1/2007 | Gunnarsson et al. | 455/442 |

FOREIGN PATENT DOCUMENTS

| | | |
|---|---|---|
| KR | 1020020014106 | 2/2002 |
| KR | 102004009638 | 11/2004 |
| KR | 1020060128513 | 12/2006 |

OTHER PUBLICATIONS (3GPP TS 25.304 Version 7.0.0 Release 7); ETSI TS 125 304, ETSI Standards, Mar. 1, 2006.

* cited by examiner

METHOD AND APPARATUS FOR SETTING UP RADIO RESOURCE CONTROL CONNECTION

PRIORITY

This application claims priority to 35 U.S.C. §119(a) to a Korean Patent Application filed in the Korean Intellectual Property Office on Apr. 14, 2006 and assigned Serial No. 2006-33967, the entire disclosure of which is hereby incorporated by reference.

BACKGROUND OF THE INVENTION

1. Field of the Invention

The present invention generally relates to a process for setting up a Radio Resource Control (RRC) connection in a mobile communication system. More particularly, the present invention relates to a method and apparatus for receiving a response message for an RRC connection request message.

2. Description of the Related Art

FIG. 1 illustrates the configuration of a $3^{rd}$ Generation Partnership Project (3GPP) Universal Mobile Telecommunication System (UMTS) network.

Referring to FIG. 1, the UMTS system includes a Core Network (CN) 100 and a plurality of Radio Network Subsystems (RNSs) 110 and 120.

The RNSs 110 and 120 form a UMTS Terrestrial Radio Access Network (UTRAN). The CN 100 includes a Mobile Switching Center (MSC) and a Visitor Location Register (VLR) to connect the UTRAN to a circuit network for a Circuit-Switched (CS) call. The CN 100 further includes a Serving General packet Radio Service (GPRS) Support Node (SGSN) and a Gateway GPRS Support Node (GGSN) to connect the UTRAN to a packet data network such as the Internet.

Each of the RNSs 110 and 120 includes a Radio Network Controller (RNC) 311 or 312 and a plurality of Node Bs 113 and 115 or 114 and 116. Specifically, the RNS 110 has the RNC 111 and the Node Bs 113 and 115 and the RNS 120 has the RNC 112 and the Node Bs 114 and 116.

The RNCs 111 and 112 are classified as a serving RNC, a drift RNC, or a control RNC according to their roles. The serving RNC manages information about each User Equipment (UE). The serving RNC is responsible for CS calls and packet transmission with the CN 100. The drift RNC is wirelessly connected directly to a UE. The control RNC controls radio resources of each Node B.

The RNCs 111 and 112 are connected to the Node Bs 113 to 116 by interfaces called Iubs. The RNCs 111 and 112 are connected to each other via an Iur interface. While not shown, a UE 130 is connected to the UTRAN via a Uu interface.

The RNCs 111 and 112 each allocate radio resources to the Node Bs 113 to 116 that the RNCs manage and the Node Bs 113 to 116 actually provide the allocated radio resources to the UE 130. The radio resources of each Node B are those for a particular cell that the Node B manages. The UE 130 establishes a radio channel using the radio resources of a particular cell that the Node B 113, 114, 115 or 116 manages and exchanges data on the radio channel.

FIG. 2 illustrates a control plane architecture for the 3GPP system.

Referring to FIG. 2, reference numeral 201 denotes a UE protocol stack and reference numeral 211 denotes a Radio Access Network (RAN) stack. Reference numeral 221 denotes a CN stack. The RAN 211 is a network responsible for radio access. It includes a Node B and an RNC. The interface between the UE 201 and the RAN 211 is called a Uu interface, and the interface between the RAN 211 and the CN 221 is called an Iu interface.

The UE and the RAN send/receive radio access-associated control information through an RRC layer which usually resides in the RNC. Control information at or below the RRC layer is called Access Stratum (AS) control information. The UE and the CN exchange mobility-associated control information involving calls, sessions, and the CN through Call Control (CC), Mobility Management (MM), Session Management (SM), and Packet Mobility Management (PMM) layers. In general, the CC/MM layer is provided at the MSC and the SM/PMM layer is at the SGSN.

The CC layer controls a CS call for the UE, sends/receives UE context information and service context information for the CS call, and manages the context information. The MM layer tracks the mobility of the UE and manages the mobility, for the CS call. The SM layer controls a Packet-Switched (PS) session, sends/receives UE context information and service context information for the PS service, and manages the context information. The PMM layer tracks the mobility of the UE and manages the mobility, for the PS service. Control information between the CN and the UE at the CC, MM, SM and PMM layers above the RRC layer is called Non-Access Stratum (NAS) control information.

Since a Radio Link Control (RLC), a Media Access Control (MAC) layer, and a PHYsical (PHY) layer are beyond the scope of the present invention, they are not described herein. The functionalities of these layers comply with the 3GPP standards.

In idle mode, the UE should first perform an RRC connection establishment procedure for an RRC connection setup to initiate a CS or PS call. The idle mode is defined as a mode in which no control channel exists between the UE and the RNC. When a control channel is established between the UE and the RNC by the RRC connection establishment procedure, control information is exchanged on the control channel between the UE and the RNC, for a call setup between the UE and the RNC and between the UE and the CN, a radio bearer is established for data transmission, and data is exchanged on the radio bearer.

FIG. 3 is a diagram illustrating a signal flow for an RRC connection setup for a UE in the idle mode.

Referring to FIG. 3, reference numeral 301 denotes a UE and reference numeral 302 denotes a RAN. The UE 301 operates in the idle mode in step 311. Upon request of an upper layer for a signaling connection setup with a network node, in step 321 the UE 301 sends an RRC CONNECTION REQUEST message to the RAN 302 in order to request a control channel setup. In step 322, the RAN 302 replies with an RRC CONNECTION SETUP message on a particular downlink channel. The RRC CONNECTION SETUP message contains control channel information. For reception of the RRC CONNECTION SETUP message, the UE 301 has to listen to the downlink channel carrying the message in a current cell during a value of a timer 303 in step 331. The timer 303 is defined as T300 or T308 in the TS25.331 standard of the 3GPP UMTS. The downlink channel is a Secondary Common Control Physical Channel (SCCPCH) which is mapped using the Identifier (ID) of the UE.

Upon receipt of the RRC CONNECTION SETUP message in step 322 before the expiration of the timer 303, the UE 301 in step 323 notifies the RAN 302 of completion of the RRC establishment by an RRC CONNECTION SETUP COMPLETE message. While the RAN 302 sends the RRC CONNECTION SETUP message in response to the RRC CONNECTION SETUP REQUEST message in the illustrated case of FIG. 3, the RAN 302 may reply with an RRC CONNECTION REJECT message rejecting the RRC connection establishment.

Because of the continuous listening to the downlink channel until receiving the RRC CONNECTION SETUP message during the timer value after sending the RRC CONNECTION REQUEST message, the UE 301 does not measure the strengths of signals from inter-frequency or inter-Radio Access Technology (RAT) neighbor cells until the expiration of the timer or until receipt of the RRC CONNECTION SETUP message during the timer value. The signal strength measuring operation is referred to as "measurement".

If the channel status of the UE becomes poor during the RRC connection establishment, the UE may not quickly reselect to a good inter-frequency or inter-RAT cell because it does not perform the measurement during the timer value.

SUMMARY OF THE INVENTION

An aspect of exemplary embodiments of the present invention is to address at least the problems and/or disadvantages of the prior art and to provide at least the advantages described below. Accordingly, an aspect of exemplary embodiments of the present invention is to provide a method and apparatus for efficiently receiving an RRC CONNECTION SETUP message in response to an RRC CONNECTION REQUEST message according to a current channel status in a UE.

In accordance with an aspect of exemplary embodiments of the present invention, there is provided a method for establishing an RRC connection with a RAN in a UE operating in an idle mode in a mobile communication system, in which the UE compares the strength of a signal received from a serving cell with a threshold value, upon requesting for RRC connection establishment, transmits an RRC connection request message to the RAN, measures the strengths of signals from neighbor cells during a first time period and monitors a downlink channel of the serving cell to receive a response message for the RRC connection request message during a second time period, if the signal strength of the serving cell is less than the threshold value, and receives the response message from the RAN on the downlink channel.

In accordance with another aspect of exemplary embodiments of the present invention, there is provided a method for establishing an RRC connection with a UE operating in an idle mode in a RAN in a mobile communication system, in which the RAN receives an RRC connection request message from the UE and transmits a response message for the RRC connection request message during a time period other than a period during which the UE measures the strengths of neighbor cells during an RRC connection establishment.

In accordance with a further aspect of exemplary embodiments of the present invention, there is provided a method for establishing an RRC connection with a UE operating in an idle mode in a RAN in a mobile communication system, in which the RAN receives an RRC connection request message from the UE, and performs one of transmitting a response message for the RRC connection request message during a first time period other than a second time period during which the UE measures the strengths of neighbor cells during an RRC connection establishment and transmitting the response message to the UE during a third time period including the second time period.

In accordance with still another aspect of exemplary embodiments of the present invention, there is provided an apparatus of a UE for establishing an RRC connection with a RAN in a mobile communication system, in which a measurer measures the strengths of signals received from a serving cell and neighbor cells, a decider and controller compares the signal strength of the serving cell with a threshold, determines whether to measure the signal strengths of the neighbor cells for a time period during an RRC connection establishment according to the comparison, and controls the measurer to measure the signal strengths of the neighbor cells for the time period during the RRC connection establishment according to a result of the determination, a message configurer generates an RRC connection request message, and a message transceiver transmits the RRC connection request message to the RAN and receives a response message for the RRC connection request message from the RAN.

In accordance with yet another aspect of exemplary embodiments of the present invention, there is provided an apparatus of a RAN for establishing a RRC connection with a UE operating in an idle mode in a mobile communication system, in which a message transceiver receives an RRC connection request message from the UE and transmits a response message for the RRC connection request message to the UE, and a decider and controller controls the message transceiver to transmit the response message during a time period other than a time period during which the UE measures the strengths of signals from neighbor cells during an RRC connection establishment.

BRIEF DESCRIPTION OF THE DRAWINGS

The above and other objects, features and advantages of certain exemplary embodiments of the present invention will be more apparent from the following detailed description taken in conjunction with the accompanying drawings, in which.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a method for receiving a response message such as RRC CONNECTION SETUP/RRC CONNECTION REJECT for an RRC CONNECTION REQUEST message in a UE in a different manner according to its channel status in a cell at the time when the UE sends the RRC CONNECTION REQUEST message.

If the strength of a signal from the cell is less than a threshold, which implies that the UE is in a bad channel status, the UE performs a measurement about inter-frequency/inter-RAT neighbor cells during a time period determined a timer value after sending the RRC CONNECTION REQUEST message. For this purpose, a gap is preset between the UE and a RAN. The UE performs the measurement during the gap and the RAN sends the RRC CONNECTION SETUP/RRC CONNECTION REJECT message to the UE at a time outside the gap. Also, the UE continues listening to a downlink channel that will carry the response message for the RRC CONNECTION REQUEST message during a time period other than the gap.

Figure 1:
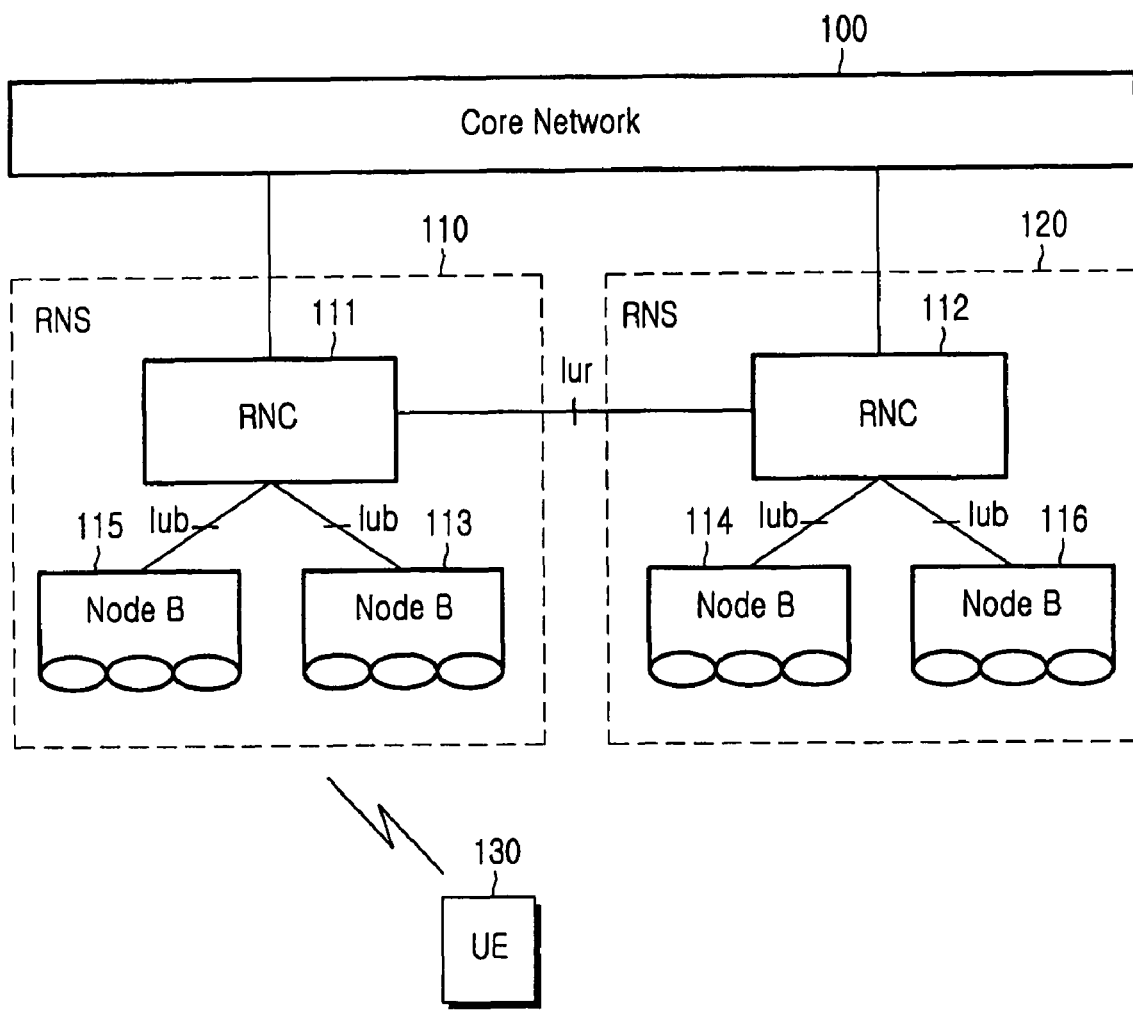
FIG. 1 illustrates the configuration of a 3GPP system.
Figure 2:
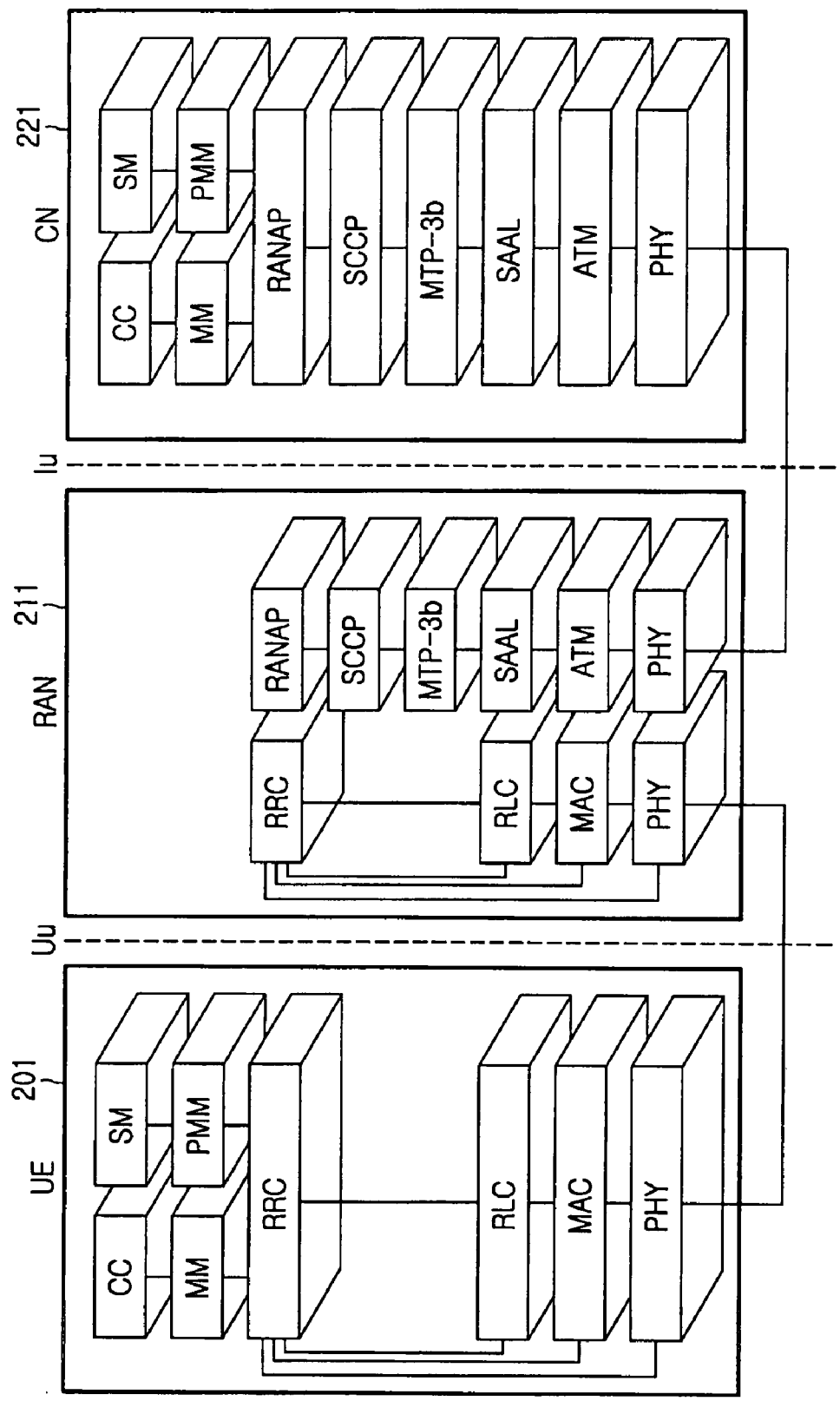
FIG. 2 illustrates a control plane architecture in the 3GPP system.
Figure 3:
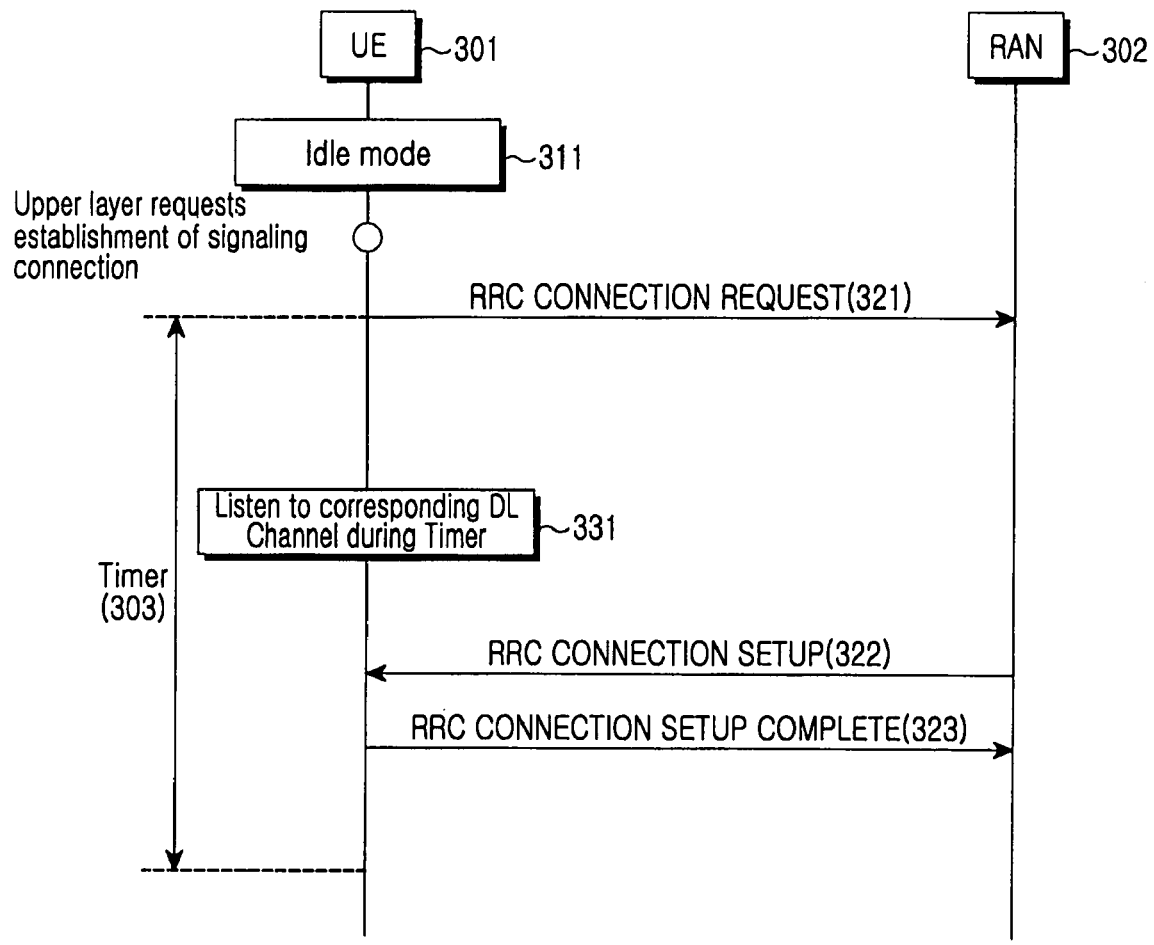
FIG. 3 is a diagram illustrating a signal flow for an RRC connection establishment procedure in the 3GPP system.

If the signal strength from the cell is greater than or equal to the threshold, which implies that the UE is in a good channel status, the UE continues listening to the downlink channel that will carry the response message for the RRC CONNECTION REQUEST message during the time period determined the timer value without applying the gap for the measurement, as illustrated in FIG. 3.

In this way, the UE performs a measurement about inter-frequency/inter-RAT neighbor cells during the gap while awaiting reception of the RRC CONNECTION SETUP PR RRC CONNECTION REJECT message, for fast inter-frequency/inter-RAT cell reselection that may often occur in a bad channel status. In a good channel status, the inter-frequency/inter-RAT measurement is not required. Therefore, an additional gap-caused delay is avoided in transmitting the RRC CONNECTION SETUP PR RRC CONNECTION REJECT message.

The decision as to whether to apply the gap for the inter-frequency/inter-RAT measurement during the RRC connection establishment depends on a comparison between a predetermined or signaled threshold with a signal strength from the cell, representing the channel status of the UE in the cell at the time when the UE sends the RRC CONNECTION REQUEST message. The UE notifies the RAN of the decision result by the RRC CONNECTION REQUEST message.

Thus, the RAN acquires information indicating whether the UE applies the gap from the RRC CONNECTION REQUEST message. If the gap is applied, the RAN sends a response message for the RRC CONNECTION REQUEST message at a time other than the gap. If the gap is not applied, the RAN can send the response message to the UE at any time irrespective of the gap.

Figure 4:
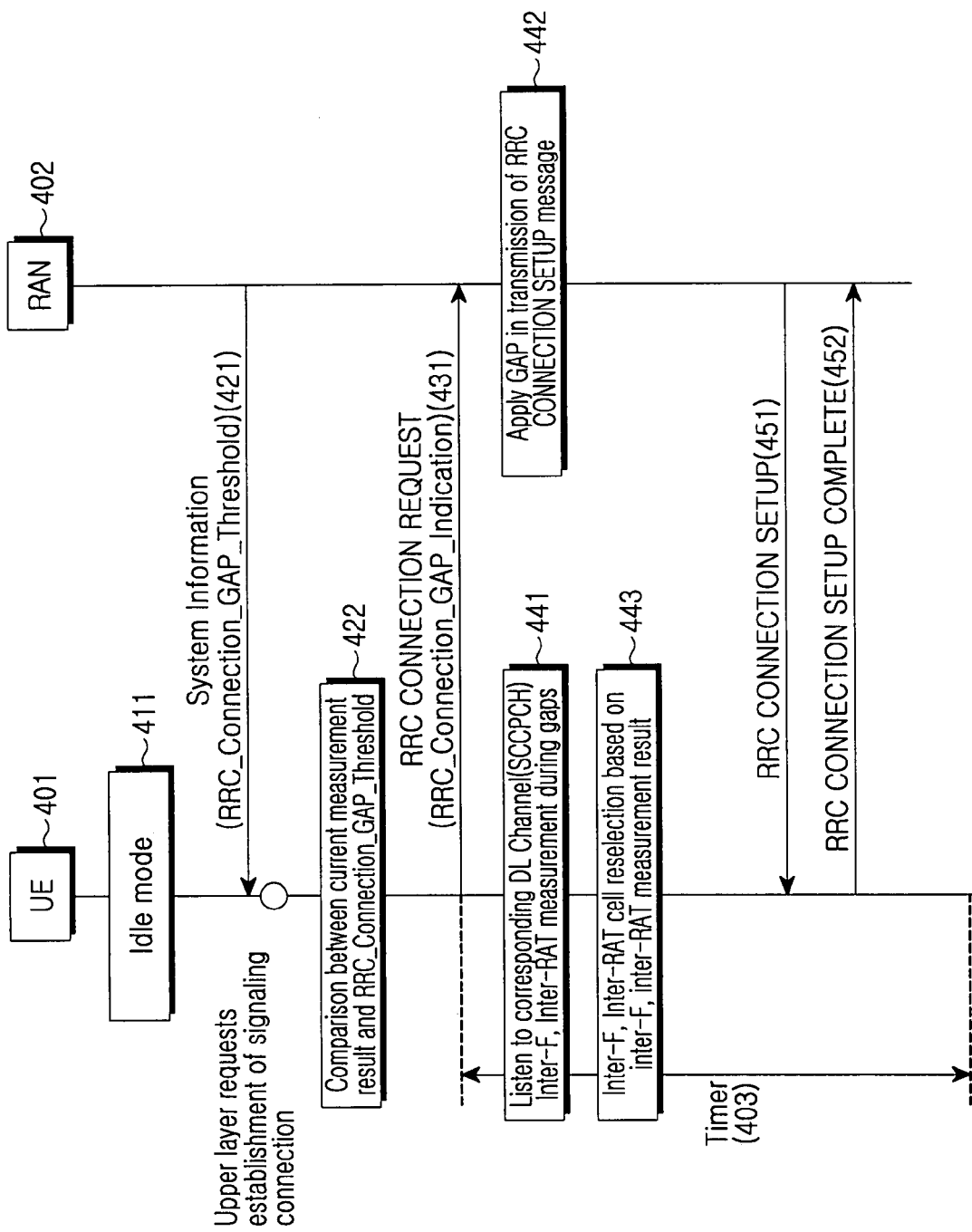
FIG. 4 is a diagram illustrating a signal flow for an RRC connection establishment procedure according to an exemplary embodiment of the present invention.

FIG. 4 is a diagram illustrating a signal flow for an RRC connection establishment procedure in an idle-mode UE according to an exemplary embodiment of the present invention.

Referring to FIG. 4, reference numeral 401 denotes a UE and reference numeral 402 denotes a RAN that controls a cell in which the UE 401 is located.

While the UE 401 is in the idle mode in step 411, the RAN 402 broadcasts system information to the UE 401 in step 421. The system information includes a threshold which will be compared with the strength of a signal from the serving cell representing the channel status of the UE to determine whether to perform an inter-frequency/inter-RAT measurement during an RRC connection establishment. While the threshold is called an "RRC_Connection_GAP_Threshold" Information Element (IE) in the illustrated case of FIG. 4, it may be given a different name. While the threshold is included in the system information in FIG. 4, it is also contemplated that the threshold is set not by explicit signaling such as the system information but by an implicit rule such as hard coding. That is, a common threshold can be defined for common use to all UEs. Also, a parameter (Sinter-search or Sinter-RAT) included in system information can be reused.

When the UE 401 receives from an upper layer a request for a signaling connection setup with the network for initiating a CS or PS call in the idle mode, the UE 401 compares the measured signal strength with the RRC_Connection_GAP_Threshold in step 421. If the signal strength is or greater than or equal to the RRC_Connection_GAP_Threshold, the UE 401 sends an RRC CONNECTION REQUEST message to the RAN 402 in step 431. The RRC CONNECTION REQUEST message includes information indicating that there is no need for a gap for inter-frequency/inter-RAT measurement during receiving an RRC CONNECTION SETUP message or an RRC CONNECTION REJECT message. On the other hand, if the signal strength is less than the RRC_Connection_GAP_Threshold, the UE 401 notifies the RAN 402 that the gap is needed by the RRC CONNECTION REQUEST message in step 431. The information indicating the need for the gap is called "RRC_Connection_GAP_Indication" in FIG. 4. Yet, the information may be named differently.

After sending the RRC CONNECTION REQUEST message, the UE 401 activates a timer 403.

In the case where the UE 401 determines to use the gap and notifies the RAN of the need for the gap in steps 422 and 431, the UE 401 performs a measurement about inter-frequency/inter-RAT neighbor cells during the gap and monitors in step 441 a downlink channel that will carry an RRC CONNECTION SETUP message in response to the RRC CONNECTION REQUEST message outside the gap.

Upon receipt of the RRC CONNECTION REQUEST message, the RAN 402 sends a response message to the UE 401 on the downlink channel outside the gap, if the RRC_Connection_GAP_Indication set in the RRC CONNECTION REQUEST message indicates that the gap will be applied. While the response message is an RRC CONNECTION SETUP message in FIG. 4, it can be an RRC CONNECTION REJECT message.

If inter-frequency/inter-RAT cell reselection is required as a result of the measurement during the gap, the UE performs the inter-frequency/inter-RAT cell reselection in step 443.

While not shown, if the UE 401 decides not to apply the gap and notifies the RAN 402 of no need for the gap, the UE 401 continues monitoring the downlink channel that will carry the response message until receiving the response message during a value of the timer 403. Upon receipt of the RRC CONNECTION REQUEST message, the RAN 402 can send the response message on the downlink channel irrespective of the gap.

If the UE 401 receives the response message before the expiration of the timer 403, or upon expiration of the timer without receiving the response message, the UE 401 discontinues applying the gap and monitoring the downlink channel.

The RRC CONNECTION SETUP message that the RAN 402 sends to the UE 401 in step 451 is an example of the response message for the RRC CONNECTION REQUEST message. The RRC CONNECTION SETUP message includes control channel information. An RRC CONNECTION SETUP COMPLETE message that the UE 401 sends to the RAN 402 in step 452 is a response message for the RRC CONNECTION SETUP message, indicating successful completion of the RRC connection establishment.

Figure 5:
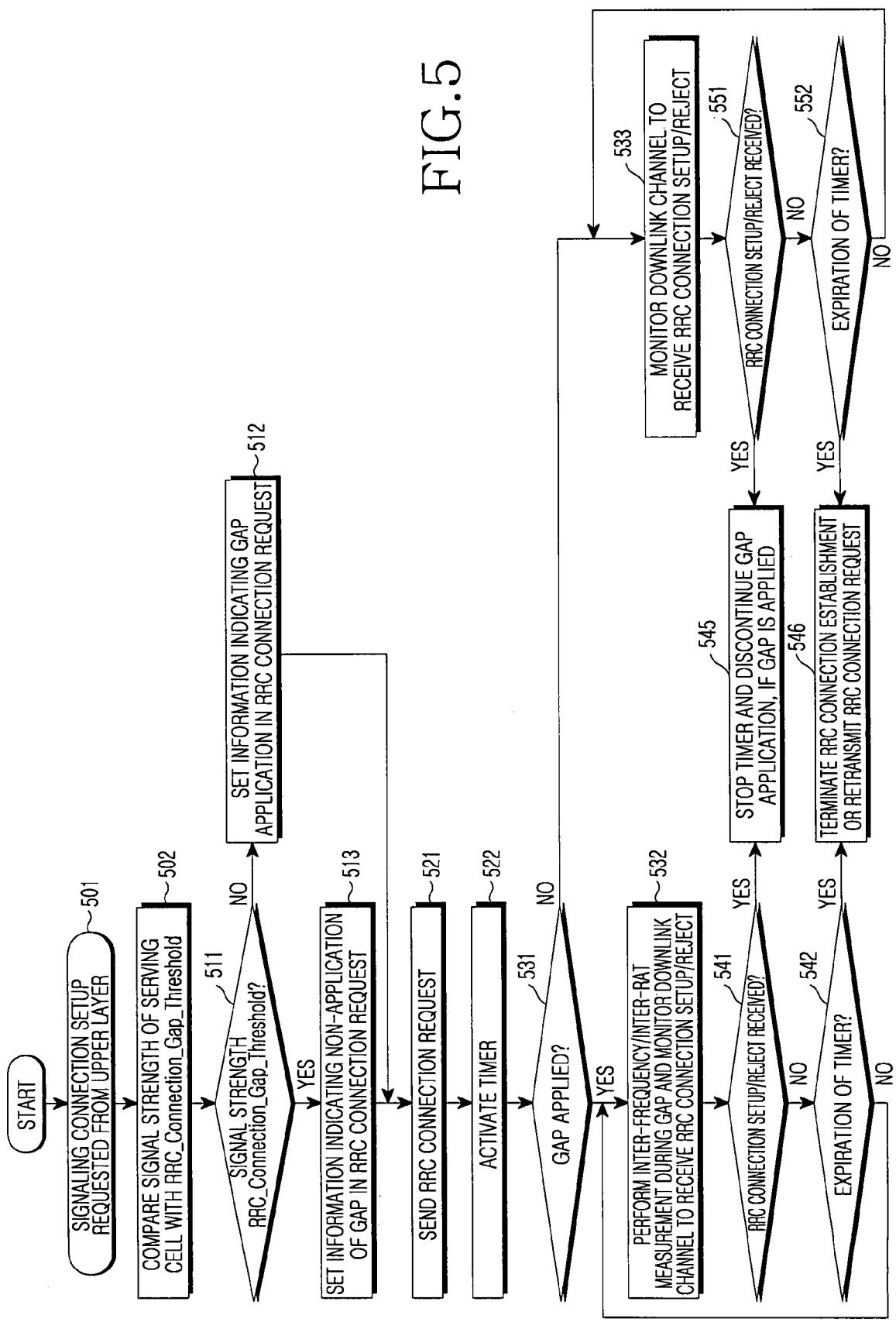
FIG. 5 is a flowchart illustrating a UE operation according to an exemplary embodiment of the present invention.

FIG. 5 is a flowchart illustrating an operation of the idle-mode UE according to an exemplary embodiment of the present invention.

Referring to FIG. 5, the UE receives a request for a signaling connection setup from the upper layer in step 501. In step 502, the UE compares a measurement of its channel status in the serving cell with RRC_Connection_Gap_Threshold. If the measurement is greater than or equal to RRC_Connection_Gap_Threshold in step 511, the UE sets information indicating non-application of a gap for inter-frequency/inter-RAT measurement in step 513. If the measurement is less than RRC_Connection_Gap_Threshold in step 511, the UE sets information indicating application of the gap for inter-frequency/inter-RAT measurement in step 512.

The information indicating application or non-application of the gap is an optional 1-bit indication or a 1-bit Boolean value indicating True or False. For example, if the 1-bit indication is included, this implies that the gap is applied. Or if the 1-bit Boolean value is set to True, this implies application of the gap. The format in which the information indicating application or non-application of the gap in an RRC CONNECTION REQUEST message is not limited in the present invention.

In step 521, the UE sends to the RAN the RRC CONNECTION REQUEST message with the information indicating application or non-application of the gap. The UE activates in step 522 a timer until receiving a response message for the RRC CONNECTION REQUEST message.

The UE checks in step 531 whether or not the gap is applied or not. If the gap is applied, the UE performs in step 532 a measurement about inter-frequency/inter-RAT neighbor cells during the gap and monitors a downlink channel that will carry the response message such as an RRC CONNECTION SETUP message or an RRC CONNECTION REJECT message outside the gap. In step 541, the UE determines if the response message has been received. If the response message has not been received, the UE determines if the timer has expired in step 542. If the timer is still running, the UE returns to step 532. Upon expiration of the timer, the UE retransmits the RRC CONNECTION REQUEST message or terminates the RRC connection establishment in step 546.

On the other hand, upon receipt of the response message in step 541, the UE discontinues the measurement operation in step 545. The subsequent operation to step 545 depends on whether the response message is the RRC CONNECTION SETUP message or the RRC CONNECTION REJECT message. In the former case, the UE notifies the RAN of completion of the RRC connection establishment by sending an RRC CONNECTION SETUP COMPLETE message. In the latter case, the UE reselects another cell and sends an RRC CONNECTION SETUP message to the cell.

If the UE decides not to apply the gap in step 531, the UE monitors in step 533 the downlink channel that will carry the response message. Compared to step 532, the gap for a measurement about the inter-frequency/inter-RAT neighbor cells is not applied and the UE just continues monitoring the downlink channel until expiration of the timer. That is, steps 533, 551 and 552 are repeated.

If the UE receives in step 551 the response message before the expiration of the timer, the UE stops the timer in step 545.

If the UE has not received the response message until the expiration of the timer, the UE goes to step 546. The same timer is used typically but different timers may be used in steps 542 and 552.

Figure 6A:
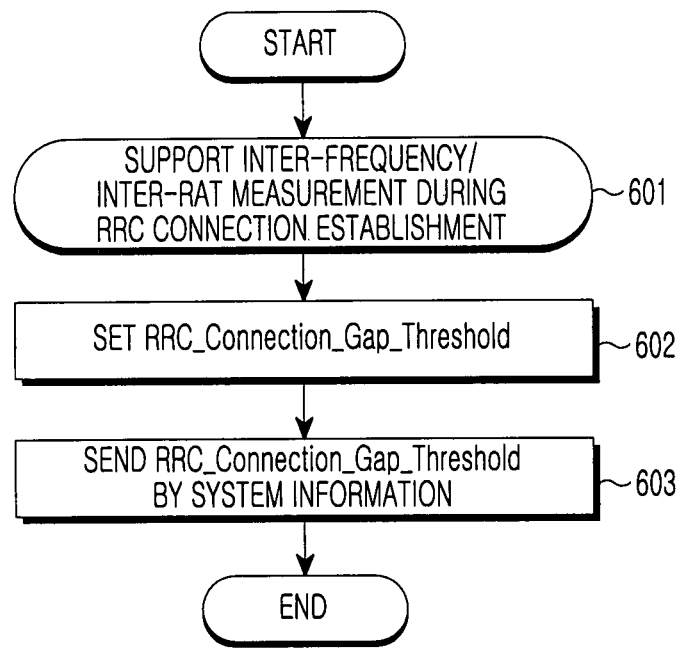
FIGS. 6A and 6B are flowcharts illustrating an RNC operation according to an exemplary embodiment of the present invention.
Figure 6B:
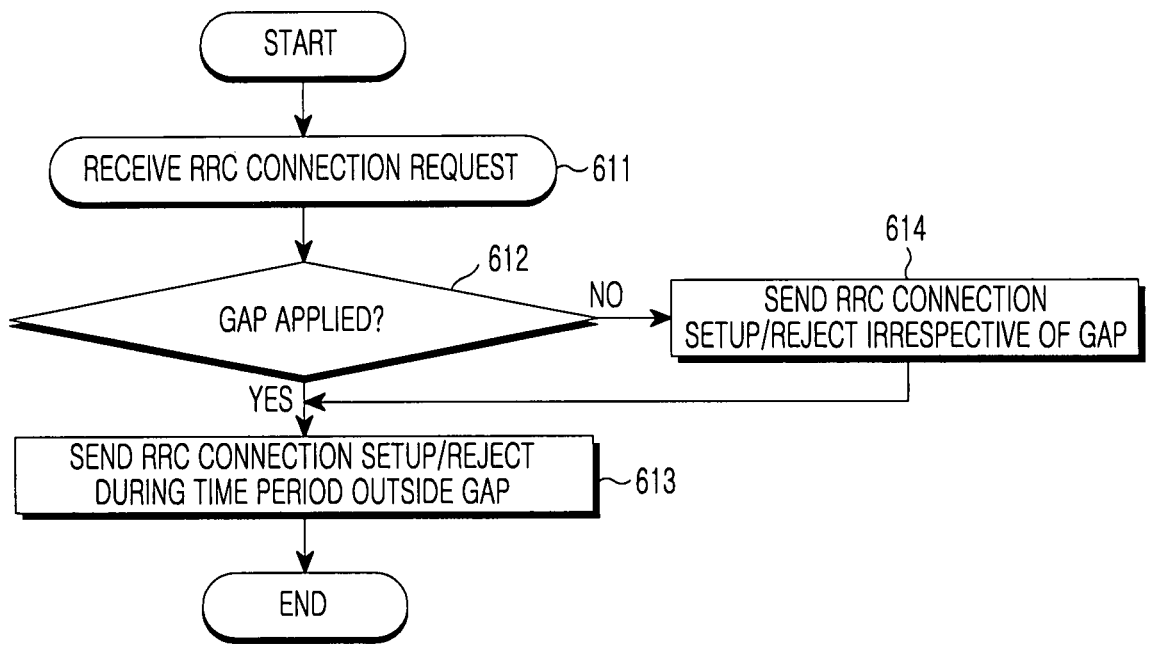

FIGS. 6A and 6B are flowcharts illustrating a RAN operation according to an exemplary embodiment of the present invention. As described above, the RAN can be limited to the RNC in FIGS. 6A and 6B.

FIG. 6A depicts an operation for sending a threshold used to determine whether to apply a gap for measurement about inter-frequency/inter-RAT neighbor cells, i.e. RRC_Connection_GAP_Threshold by system information in an RRC connection establishment procedure.

Referring to FIG. 6A, the RAN supports the application of a gap for measuring about inter-frequency/inter-RAT neighbor cells during the RRC connection establishment in step 601 and sets the RRC_Connection_GAP_Threshold in step 602. In step 603, the RAN broadcasts the RRC_Connection_GAP_Threshold by system information.

FIG. 6B depicts an operation for processing a received RRC CONNECTION REQUEST message in the RAN in the case where the RAN supports the use of a gap for measuring inter-frequency/inter-RAT neighbor cells.

Referring to FIG. 6B, the RAN receives an RRC CONNECTION REQUEST message from the UE in step 611 and determines in step 612 that RRC CONNECTION REQUEST message indicates application of the gap. If the RRC CONNECTION REQUEST message indicates application of the gap, the RAN replies to the UE with an RRC CONNECTION SETUP message or an RRC CONNECTION REJECT message in step 613. This response message is sent on a downlink channel outside the gap. If the RRC CONNECTION REQUEST message indicates non-application of the gap, the RAN sends in step 614 the response message on the downlink channel irrespective of the gap.

Figure 7:
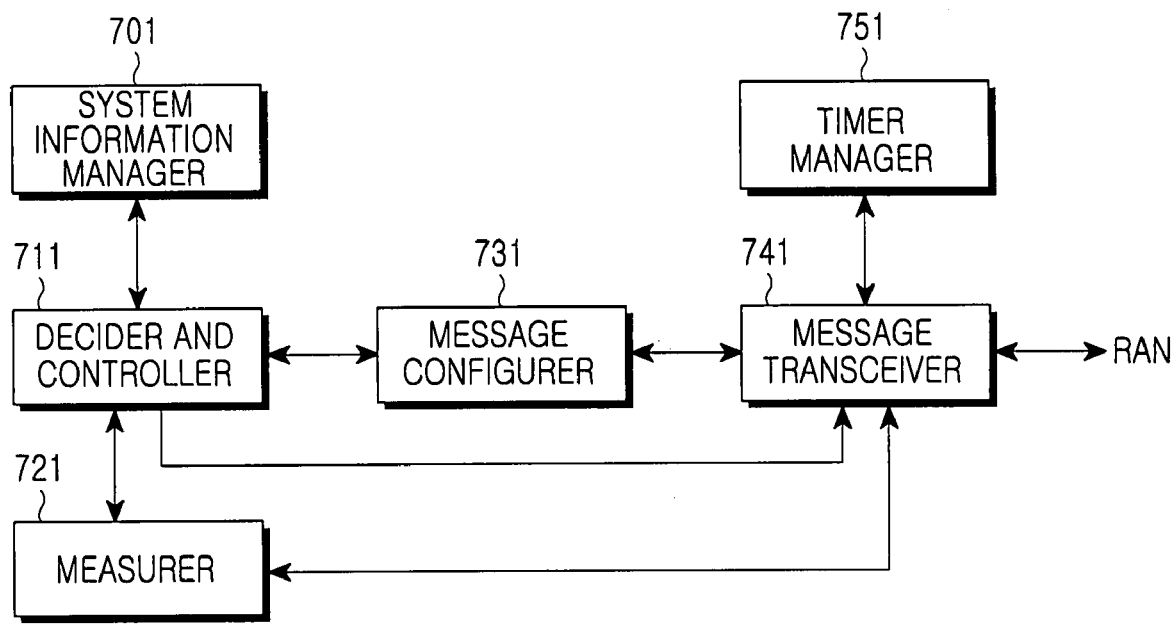
FIG. 7 is a block diagram of a UE apparatus according to an exemplary embodiment of the present invention.

FIG. 7 is a block diagram of the UE according to an exemplary embodiment of the present invention.

Referring to FIG. 7, a system information manager 701 manages parameters acquired by system information. The parameters contain a threshold RRC_Connection_Gap_Indication used to decide the application or non-application of a gap for measuring about inter-frequency/inter-RAT neighbor cells.

A measurer 721 performs an intra-frequency measurement including the serving cell and an inter-frequency/inter-RAT measurement.

A decider and controller 711 compares the RRC_Connection_Gap_Indication with measurements of the serving cell measured by the measurer 721, determines whether to apply the gap, and if applying the gap, controls the gap.

A message configurer 731 sets information indicating the application or non-application of the gap in an RRC CONNECTION REQUEST message under the control of the decider and controller 711.

A message transceiver 741 sends the RRC CONNECTION REQUEST message to the RAN or receives a response message for the RRC CONNECTION REQUEST message. If the decider and controller 711 decides to apply the gap, the message transceiver 741 is aware of the gap by exchanging information with the decider and controller 711. The measurer 721 takes measurements of inter-frequency/inter-RAT neighbor cells during the gap and the message transceiver 741 receive a downlink channel that will carry the response message for the RRC CONNECTION REQUEST message outside the gap.

A timer manager 751 manages the activation, stop and deactivation of a timer. It keeps the timer active until the UE receives the response message on the downlink channel after sending the RRC CONNECTION REQUEST message.

Figure 8:
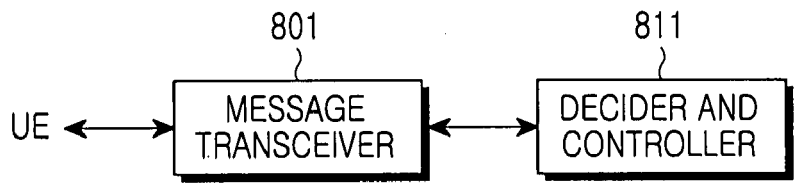
FIG. 8 is a block diagram of an RNC apparatus according to an exemplary embodiment of the present invention.

FIG. 8 is a block diagram of the RAN according to an exemplary embodiment of the present invention. Also, the RAN can be limited to the RNC in FIG. 8.

Referring to FIG. 8, a message transceiver 801 receives an RRC CONNECTION REQUEST message from the UE and sends a response message for the RRC CONNECTION REQUEST message to the UE.

A decider and controller 811 interprets the RRC CONNECTION REQUEST message and determines whether the UE applies a gap for the measurements of inter-frequency/inter-RAT neighbor cells during an RRC connection establishment. If determining that the UE applies the gap, the decider and controller 811 controls the message transceiver 801 to send an RRC CONNECTION SETUP message or an RRC CONNECTION REJECT message as the response message outside the gap.

Figure 9:
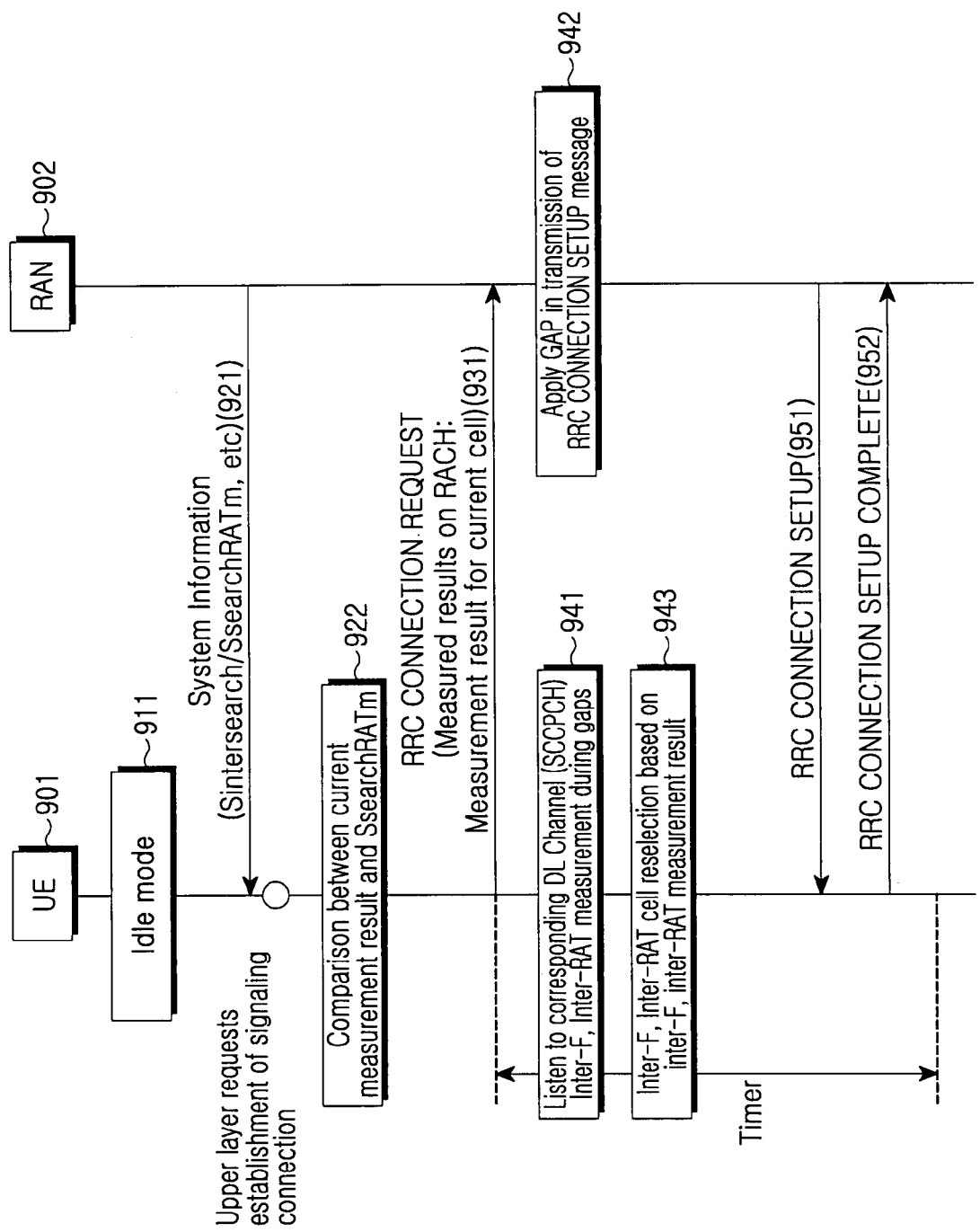
FIG. 9 is a diagram illustrating a signal flow for an RRC connection establishment procedure according to another exemplary embodiment of the present invention.

FIG. 9 is a diagram illustrating a signal flow for an RRC connection establishment procedure in the idle-mode UE according to another exemplary embodiment of the present invention. Compared to the RRC connection establishment procedure illustrated in FIG. 4, existing system information or existing information in an RRC CONNECTION REQUEST message is utilized rather than including new information in the system information or the RRC CONNECTION REQUEST message.

Referring to FIG. 9, reference numeral 901 denotes a UE and reference numeral 902 denotes a RAN that controls the serving cell of the UE 901. The UE 901 is in the idle mode in step 911 and system information is broadcast in the cell in step 921. The system information has a parameter that can substitute for the RRC_Connection_GAP_Threshold IE. This exemplary embodiment of the present invention proposes the reuse of the parameter as the threshold RRC_Connection_GAP_Threshold. The parameter is, for example, Sintersearch or SsearchRATm in System Information Block (SIB) #3 or SIB #4. An SIB is a set of pieces of system information with similar characteristics or functions. SIB #3 and SIB #4 include information about cell access control and measurement-related system information. SIB #3 provides information for an idle-mode UE, and SIB #4 provides information for a connected-mode UE. SIB #3 may be commonly applied to both the idle-mode UE and the connected-mode UE. SIB #3 and SIB #4 comply with 3GPP TS25.331v700. As stated above, SIB #3 and SIB#4 include information such as Sintersearch and SsearchRATm. Sintersearch represents a threshold for the channel status of the UE in the serving cell, for use in starting a measurement of inter-frequency neighbor cells. SsearchRATm represents a threshold for the channel status of the UE in the serving cell, which is used for starting a measurement of inter-RAT neighbor cells. The measurement-related threshold parameters such as Sintersearch and SsearchRATm are compliant with 3GPP TS25.304v700.

To use the parameters sent by the system information, a parameter to be used should be implicitly defined beforehand between the UE and the network. While SsearchRATm is used as a threshold to be compared with a measurement about the channel status of the UE in the serving cell in deciding as to whether to perform a measurement of inter-frequency/inter-RAT neighbor cells according to an implicit rule between the UE and the network in the illustrated case of FIG. 9, Sintersearch or any other measurement-related threshold parameter included in SIB #3 can be used instead.

When the UE 901 receives a request for a signaling connection setup with the network for initiating a CS or PS call from an upper layer in the idle mode, the UE 901 measures its channel status in the serving cell and compares the measurement with the SsearchRATm in step 922. If SIB #3 and SIB #4 are broadcast in the cell, a parameter to be used should be implicitly preset from among the parameters of the SIBs. While a parameter in SIB#3 is used herein, a parameter in SIB #4 is also available if only SIB #4 without SIB #3 is broadcast in the cell.

If the measurement is less than the SsearchRATm in step 922, the UE 901 decides to apply a gap for measuring about inter-frequency/inter-RAT neighbor cells, performs a measurement of the inter-frequency/inter-RAT neighbor cells during the gap, and listens in step 941 to a downlink channel that will carry an RRC CONNECTION SETUP message in response to the RRC CONNECTION REQUEST message outside the gap. The measurement is included in "Measurement result for current cell" of "Measured results on RACH" in the conventional RRC CONNECTION REQUEST message sent in step 931. The configuration of the RRC CONNECTION REQUEST message is compliant with 3GPP TS25.331v700.

After sending the RRC CONNECTION REQUEST message, the UE 901 activates a timer as described earlier.

Upon receipt of the RRC CONNECTION REQUEST message, if "Measurement result for current cell" is less than the SsearchRATm of SIB #3, the RAN 902 replies with an RRC CONNECTION SETUP message on the downlink channel outside the gap, considering that the gap is applied in step 942. While the response message is the RRC CONNECTION SETUP message in FIG. 9, the response message can be an RRC CONNECTION REJECT message. Thus, "Measurement result for current cell" functions like the RRC_Connection_GAP_Indication of FIG. 4. If "Measurement result for current cell" is greater than or equal to the SsearchRATm, the RAN 902 considers that the gap is not applied. If "Measurement result for current cell" is less than the SsearchRATm, the RAN 902 considers that the gap is applied.

If inter-frequency/inter-RAT cell reselection is required as a result of the measurement during the gap, the UE performs the inter-frequency/inter-RAT cell reselection in step 943.

On the other hand, if the measurement is greater than or equal to the SsearchRATm in step 922, the UE 901 decides not to apply the gap and continues monitoring the downlink channel that will carry the response message until receiving the response message. In this case, "Measurement result for current cell" in the RRC CONNECTION REQUEST message is greater than or equal to the SsearchRATm, the RAN 902 also determines that the gap is not applied and sends the response message on the downlink channel irrespective of the gap.

If the UE 901 receives the response message before the expiration of the timer, or upon expiration of the timer without receiving the response message, the UE 901 discontinues applying the gap and monitoring the downlink channel. In step 951, the RAN 902 sends an RRC CONNECTION SETUP message to the UE 401 as the response message for the RRC CONNECTION REQUEST message. The UE 901 replies with an RRC CONNECTION SETUP COMPLETE message, indicating successful completion of the RRC connection establishment in step 952.

While not shown, it can be further contemplated that the RAN 902 sets new 1-bit information in the system information to indicate whether the second exemplary embodiment of the present invention is supported, the UE 901 and the RAN 902 operate according to the second exemplary embodiment of the present invention, if the new 1-bit information indicates that the second exemplary embodiment of the present invention is supported, and the UE 901 and the RAN 902 operate conventionally as illustrated in FIG. 3, if the new 1-bit information indicates that the second exemplary embodiment of the present invention is not supported.

Figure 10:
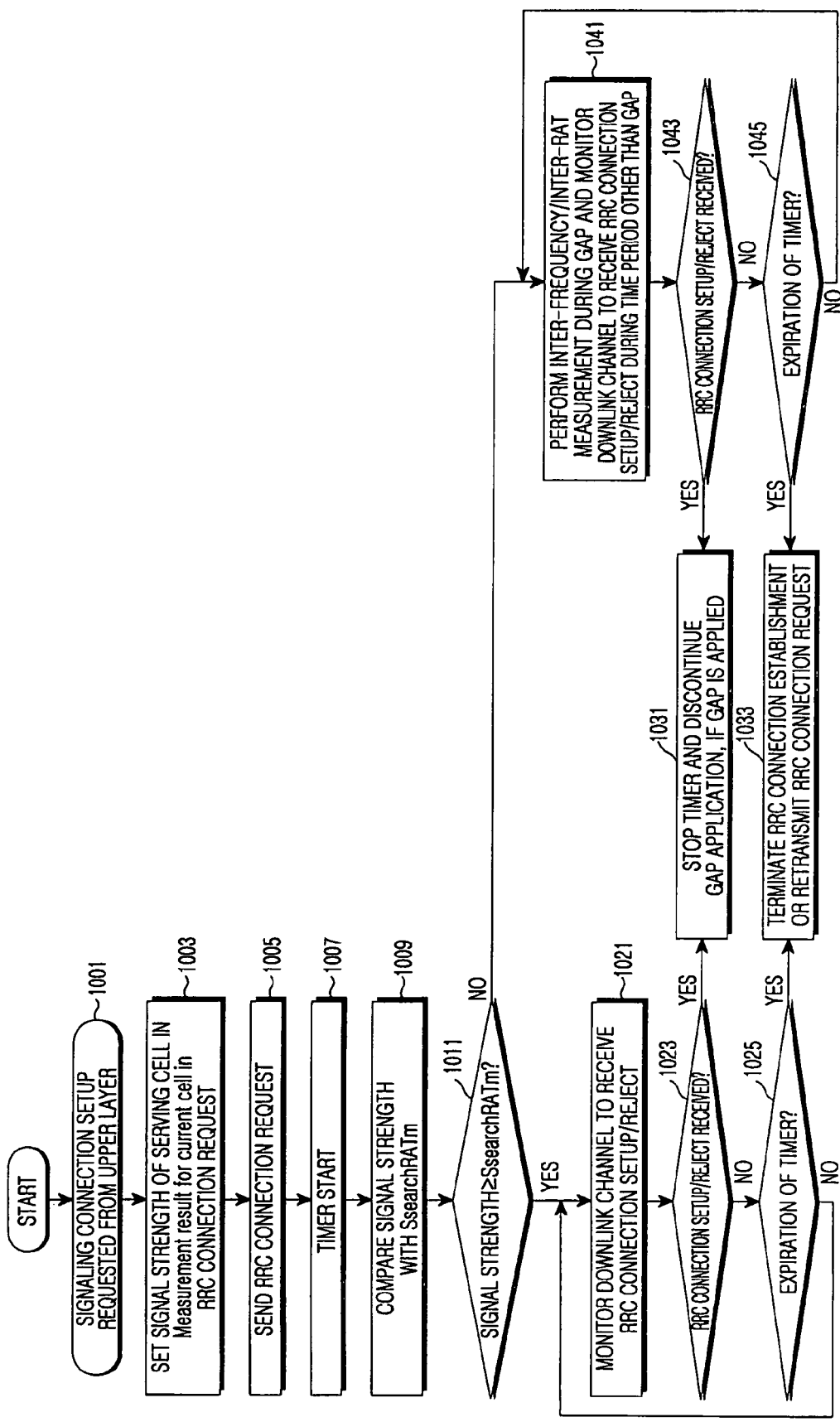
FIG. 10 is a flowchart illustrating a UE operation according to another exemplary embodiment of the present invention.

FIG. 10 is a flowchart illustrating an operation of the idle-mode UE according to another exemplary embodiment of the present invention.

Referring to FIG. 10, the UE receives in step 1001 a request for a signaling connection setup from the upper layer in the idle mode. In step 1002, the UE sets a measurement of its channel status in the serving cell in "Measurement result for current cell" of an RRC CONNECTION REQUEST message in step 1003 and sends the RRC CONNECTION REQUEST message to the RAN in step 1005. The UE in step 1007 activates a timer to a time period for which the UE awaits reception of a response message for the RRC CONNECTION REQUEST message. In step 1009, the UE compares the measurement with SsearchRATm included in SIB #3.

If the measurement is less than the SsearchRATm, the UE determines to apply a gap for measuring of inter-frequency/inter-RAT neighbor cells in step 1011. In step 1041, the UE performs a measurement of the inter-frequency/inter-RAT neighbor cells during the gap and monitors a downlink channel that will carry the response message such as an RRC CONNECTION SETUP message or an RRC CONNECTION REJECT message outside the gap. If the response message has been received in step 1043 before the expiration of the timer, the UE discontinues applying the gap in step 1031 and performs the subsequent operation.

The subsequent operation to step 545 depends on whether the response message is the RRC CONNECTION SETUP message or the RRC CONNECTION REJECT message. In the former case, the UE notifies the RAN of completion of the RRC connection establishment by sending an RRC CONNECTION SETUP COMPLETE message. In the latter case, the UE reselects another cell and sends an RRC CONNECTION SETUP message to the cell. If in step 1045 the UE has not received the response message until the expiration of the timer, it retransmits the RRC CONNECTION REQUEST message or terminates the RRC connection establishment in step 1033.

If the measurement is greater than or equal to the SsearchRATm in step 1011, the UE decides not to apply the gap and monitors the downlink channel that will carry the response message in step 1021. Compared to step 1041, the gap for a measurement about the inter-frequency/inter-RAT neighbor cells is not applied and the UE just continues monitoring the downlink channel. If in step 1023 receiving the response message before the expiration of the timer, the UE stops the timer in step 1031. If the UE has not received the response message until the expiration of the timer in step 1025, the UE performs the subsequent operation in step 1033. The same timer is typically used in steps 1025 and 1045, but different timers can also used.

Figure 11:
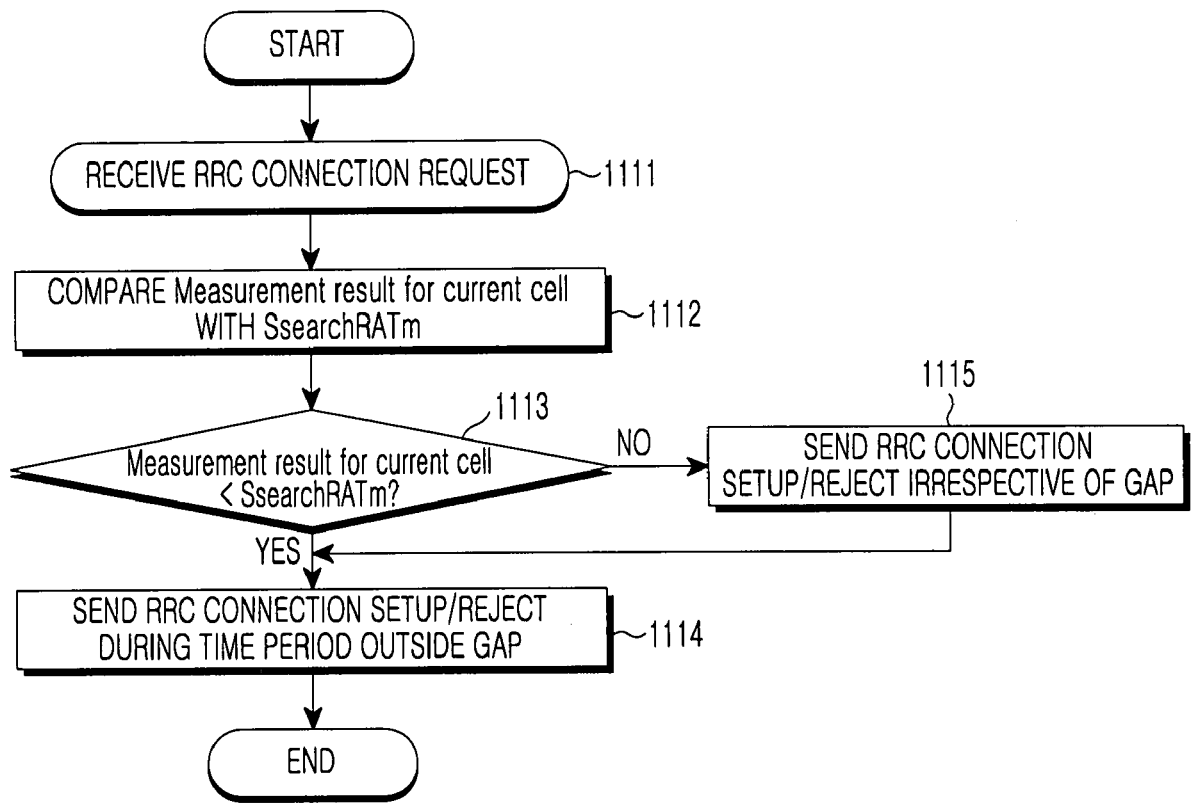
FIG. 11 is a flowchart illustrating an RNC operation according to another exemplary embodiment of the present invention.

FIG. 11 is a flowchart illustrating a RAN operation according to another exemplary embodiment of the present invention. The RAN can be limited to the RNC.

Referring to FIG. 11, upon receipt of an RRC CONNECTION REQUEST message from the UE in step 1111, the RAN interprets "Measurement result for current cell" representing the channel status of the UE in the serving cell in the received message and compares the "Measurement result for current cell" value with SsearchRATm in SIB #3 in step 1112. If the "Measurement result for current cell" value is less than the SsearchRATm, the RAN sends a response message such as an RRC CONNECTION SETUP message or an RRC CONNECTION REJECT message on a downlink channel outside a gap for measuring about inter-frequency/inter-cell neighbor cells in step 1114.

If the "Measurement result for current cell" value is greater than or equal to the SsearchRATm, the RAN sends the response message on the downlink channel irrespective of the gap in step 1115.

As is apparent from the above description, the present invention enables UEs in bad channel status to reselect to the best neighbor cell taking into account their channel statuses and other system parameters after inter-frequency/inter-RAT measurement during awaiting reception of an RRC CONNECTION SETUP message. As UEs in good channel status do not perform the inter-frequency/inter-RAT measurement during awaiting reception of the RRC CONNECTION SETUP message, they can establish an RRC connection reliably without delay.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for establishing a Radio Resource Control (RRC) connection with a Radio Access Network (RAN) in a User Equipment (UE) operating in an idle mode in a mobile communication system, comprising:
   comparing a strength of a signal received from a serving cell with a threshold upon receiving a request for a signaling connection setup from an upper layer;
   transmitting an RRC connection request message to the RAN after comparing the strength of the signal with the threshold;
   measuring strengths of signals from neighbor cells and monitoring a downlink channel of the serving cell to receive the response message during a first time period beginning at transmission of the RRC connection request message and prior to reception of a response message for the RRC connection request message, when the signal strength of the serving cell is less than the threshold; and
   receiving the response message from the RAN on the downlink channel.

2. The method of claim 1, further comprising monitoring the downlink channel to receive the response message for the RRC connection request message, without measuring the signal strengths of the neighbor cells, if the signal strength of the serving cell is greater than or equal to the threshold.

3. The method of claim 1, further comprising receiving from the RAN system information for RRC connection establishment before transmitting the RRC connection request, the system information including the threshold.

4. The method of claim 3, wherein the threshold is one of parameters Sintersearch and SsearchRATm included in system information blocks.

5. The method of claim 1, wherein the transmission comprises transmitting information indicating by the RRC connection request message if the first time period is applied.

6. The method of claim 1, wherein the transmission comprises transmitting the signal strength of the serving cell by the RRC connection request message.

7. The method of claim 1, further comprising:
   determining according to the signal strengths of the neighbor cells whether cell reselection is required; and performing a cell reselection to one of the neighbor cells according to the signal strengths of the neighbor cells, if the cell reselection is required.

8. The method of claim 1, further comprising:
transmitting an RRC connection setup complete message to the RAN, if the response message is an RRC connection setup message; and
performing a cell reselection to one of the neighbor cells and retransmitting the RRC connection request message, if the response message is an RRC connection reject message.

9. The method of claim 1, further comprising performing one of retransmitting the RRC connection request message and terminating RRC connection establishment, if the response message is not received during the first time period.

10. A method for establishing a Radio Resource Control (RRC) connection with a User Equipment (UE) operating in an idle mode in a Radio Access Network (RAN) in a mobile communication system, comprising:
receiving an RRC connection request message from the UE;
determining whether a first time period is applied during which the UE measures signal strengths of neighbor cells, wherein the first time period begins at transmission of the RRC connection request message;
transmitting a response message for the RRC connection request message after the first time period, when it is determined that the first time period is applied;
transmitting the response message to the UE during a second time period that includes the first time period, when it is determined that the first time period is not applied:
wherein a determination of whether to apply the first time period is based on a strength of a signal from a serving cell to the UE.

11. The method of claim 10, wherein the RRC connection request message includes information indicating if the first time period is applied.

12. The method of claim 11, further comprising broadcasting system information to the UE before receiving the RRC connection request message, the system information including a threshold that the UE compares with the strength of the signal from the serving cell of the UE to determine whether to apply the first time period.

13. The method of claim 12, wherein the threshold is one of parameters Sintersearch and SsearchRATm included in system information blocks.

14. The method of claim 12, wherein the RRC connection request message includes the signal strength of the serving cell so that the RAN compares with the threshold to determine whether to apply the first time period.

15. An apparatus of a User Equipment (UE) for establishing a Radio Resource Control (RRC) connection with a Radio Access Network (RAN) in a mobile communication system, comprising:

a measurer for measuring the strengths of signals received from a serving cell and neighbor cells;
a decider and controller for comparing the signal strength of the serving cell with a threshold upon receiving a request for a signaling connection setup from an upper layer, determining whether to measure the signal strengths of the neighbor cells for a time period beginning at transmission of the RRC connection request message and prior to reception of a response message for the RRC connection request message according to the comparison, and controlling the measurer to measure the signal strengths of the neighbor cells for the time period during RRC connection establishment when the signal strength of the serving cell is less than the threshold;
a message configurer for generating an RRC connection request message; and
a message transceiver for transmitting the RRC connection request message to the RAN after comparing the strength of the signal with the threshold and receiving the response message for the RRC connection request message from the RAN.

16. The apparatus of claim 15, wherein the message configurer includes information indicating whether the time period is applied to measure the signal strengths of the neighbor cells in the RRC connection request message.

17. An apparatus of a Radio Access Network (RAN) for establishing a Radio Resource Control (RRC) connection with a User Equipment (UE) operating in an idle mode in a mobile communication system, comprising:
a message transceiver for receiving from the UE an RRC connection request message and transmitting to the UE a response message for the RRC connection request message; and
a decider and controller for determining whether a first time period is applied during which the UE measures signal strengths of neighbor cells, controlling the message transceiver to transmit the response message after the first time period when it is determined that the first time period is applied, and controlling the message transceiver to transmit the response message during a second time period that includes the first time period when it is determined that the first time period is not applied;
wherein the first time period begins at transmission of the RRC connection request Message; and
wherein a determination of whether to apply the first time period is based on a strength of a signal from a serving cell to the UE.

* * * * *